(12) United States Patent
Kim et al.

(10) Patent No.: US 12,148,887 B2
(45) Date of Patent: Nov. 19, 2024

(54) NON-AQUEOUS ELECTROLYTE SOLUTION FOR LITHIUM SECONDARY BATTERY AND LITHIUM SECONDARY BATTERY INCLUDING THE SAME

(71) Applicant: LG Energy Solution, Ltd., Seoul (KR)

(72) Inventors: Hyun Seung Kim, Daejeon (KR); Yu Ha An, Daejeon (KR); Chul Haeng Lee, Daejeon (KR); Jeong Woo Oh, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 505 days.

(21) Appl. No.: 17/607,288

(22) PCT Filed: Aug. 11, 2020

(86) PCT No.: PCT/KR2020/010630
§ 371 (c)(1),
(2) Date: Oct. 28, 2021

(87) PCT Pub. No.: WO2021/033987
PCT Pub. Date: Feb. 25, 2021

(65) Prior Publication Data
US 2022/0352551 A1    Nov. 3, 2022

(30) Foreign Application Priority Data

Aug. 21, 2019 (KR) .................. 10-2019-0102520

(51) Int. Cl.
*H01M 10/0567* (2010.01)
*H01M 10/0525* (2010.01)

(52) U.S. Cl.
CPC ... *H01M 10/0567* (2013.01); *H01M 10/0525* (2013.01); *H01M 2300/0025* (2013.01)

(58) Field of Classification Search
CPC ......... H01M 10/0567; H01M 10/0525; H01M 2300/0025
See application file for complete search history.

(56) References Cited

U.S. PATENT DOCUMENTS

| 2,815,349 A | 12/1957 | Claude et al. |
| 2003/0091905 A1 | 5/2003 | Nobuta et al. |

(Continued)

FOREIGN PATENT DOCUMENTS

| CN | 101919105 A | 12/2010 |
| CN | 102091026 A | 6/2011 |

(Continued)

OTHER PUBLICATIONS

Zbigniew Fikalek, Petr Zuman, "Determination of Methimazole and Carbimazole Using Polarography and Voltammetry," Analytical Letters, 23:7, 1213-1233. (Year: 1990).*

(Continued)

*Primary Examiner* — Matthew T Martin
*Assistant Examiner* — Katherine N Higgins
(74) *Attorney, Agent, or Firm* — Lerner David LLP

(57) ABSTRACT

A non-aqueous electrolyte solution for a lithium secondary battery and a lithium secondary battery including the same are disclosed herein. In some embodiments, a non-aqueous electrolyte solution includes a compound represented by Formula 1 having an excellent effect of scavenging a decomposition product generated from a lithium salt in the electrolyte solution, as a first additive, and lithium difluorophosphate as a second additive. The lithium secondary battery include the non-aqueous electrolyte solution has improved high-temperature durability.

9 Claims, 1 Drawing Sheet

(56) References Cited

U.S. PATENT DOCUMENTS

| | | | |
|---|---|---|---|
| 2005/0135045 A1 | 6/2005 | Nobuta et al. | |
| 2011/0052999 A1 | 3/2011 | Lee et al. | |
| 2014/0272604 A1* | 9/2014 | Lim | H01M 10/052 |
| | | | 429/341 |
| 2014/0342239 A1* | 11/2014 | Lee | H01M 10/0566 |
| | | | 429/336 |
| 2015/0140445 A1 | 5/2015 | Aoki et al. | |
| 2015/0288030 A1* | 10/2015 | Yoo | H01M 10/0569 |
| | | | 429/188 |
| 2019/0020063 A1 | 1/2019 | Kim et al. | |
| 2020/0052322 A1 | 2/2020 | Yu et al. | |
| 2022/0089548 A1 | 3/2022 | Kim et al. | |
| 2022/0352551 A1 | 11/2022 | Kim et al. | |
| 2022/0393241 A1* | 12/2022 | Kim | H01M 10/0567 |

FOREIGN PATENT DOCUMENTS

| | | |
|---|---|---|
| CN | 104781976 A | 7/2015 |
| CN | 104979587 A | 10/2015 |
| CN | 108604709 A | 9/2018 |
| CN | 109686990 A | 4/2019 |
| CN | 110071329 A | 7/2019 |
| CN | 113728483 A | 11/2021 |
| EP | 3893311 A1 | 10/2021 |
| EP | 3951987 A1 | 2/2022 |
| JP | 2003007333 A | 1/2003 |
| JP | 2003208920 A | 7/2003 |
| JP | 2022529794 A | 6/2022 |
| KR | 100478554 B1 | 3/2005 |
| KR | 20080047145 A | 5/2008 |
| KR | 100879363 B1 | 1/2009 |
| KR | 100975898 B1 | 8/2010 |
| KR | 101013328 B1 | 2/2011 |
| KR | 20140104383 A | 8/2014 |
| KR | 20190033448 A | 3/2019 |
| KR | 20200089624 A | 7/2020 |
| WO | 2009091138 A2 | 7/2009 |
| WO | 2013187073 A1 | 12/2013 |
| WO | 2015030196 A1 | 3/2015 |
| WO | 2019059694 A2 | 3/2019 |

OTHER PUBLICATIONS

Fijalek, Z., & Zuman, P. (1990). Determination of Methimazole and Carbimazole Using Polarography and Voltammetry. Analytical Letters, 23(7), 1213-1233. https://doi.org/10.1080/00032719008054349 (Year: 2006).*

Extended European Search Report including Written Opinion for Application No. 20854252.2 dated Jun. 15, 2022, pp. 1-7.

Fijalek, Z. et al., "Determination of Methimazole and Carbimazole Using Polarography and Voltammetry," Analytical Letters, Oct. 2006, pp. 1213-1233, vol. 23, No. 7, Marcel Dekker, Inc.

International Search Report for Application No. PCT/KR2020/010630 mailed Nov. 25, 2020, 3 Pages.

* cited by examiner

[FIG. 1]
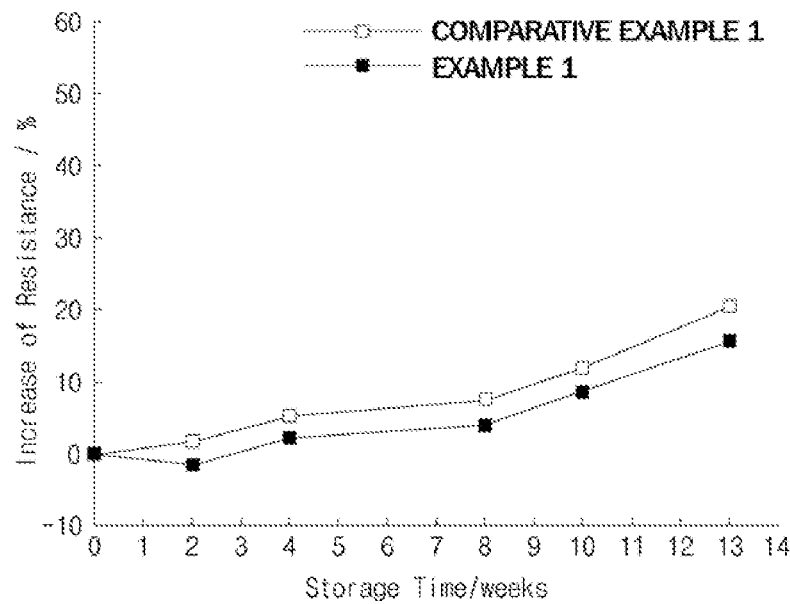
[FIG. 2]
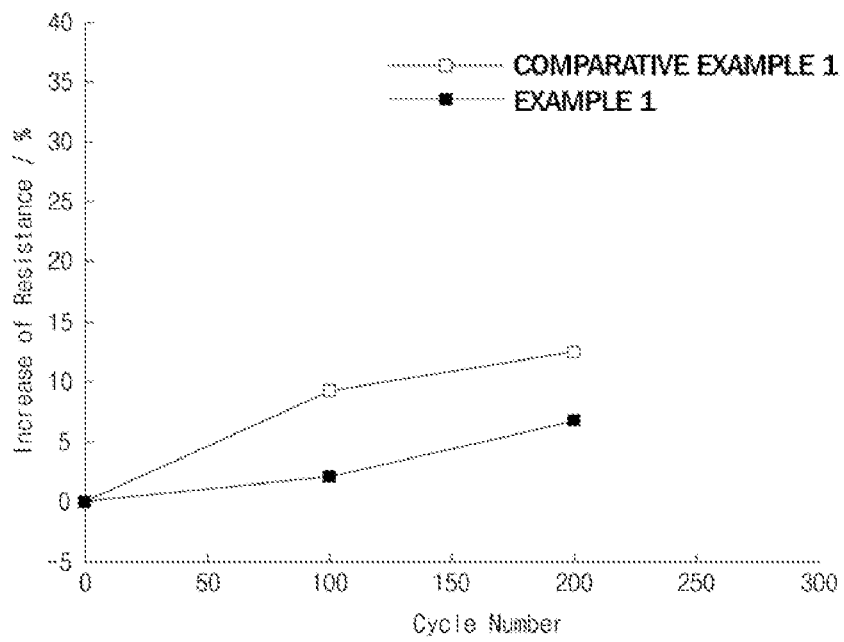

NON-AQUEOUS ELECTROLYTE SOLUTION FOR LITHIUM SECONDARY BATTERY AND LITHIUM SECONDARY BATTERY INCLUDING THE SAME

CROSS-REFERENCE TO RELATED APPLICATIONS

The present application is a national phase entry under 35 U.S.C. § 371 of International Application No. PCT/KR2020/010630, filed on Aug. 11, 2020, which claims priority from Korean Patent Application No. 10-2019-0102520, filed on Aug. 21, 2019, the disclosures of which are incorporated by reference herein.

TECHNICAL FIELD

The present invention relates to a non-aqueous electrolyte solution for a lithium secondary battery, which includes an additive having an excellent effect of scavenging a decomposition product generated from a lithium salt, and a lithium secondary battery in which high-temperature durability is improved by including the same.

BACKGROUND ART

There is a need to develop technology for efficiently storing and utilizing electrical energy as personal IT devices and computer networks are developed with the development of information society and the accompanying dependency of society as a whole on the electrical energy is increased.

Among the technologies developed for this purpose, a technology based on secondary batteries is the most suitable technology for various applications. Since a secondary battery may be miniaturized to be applicable to a personal IT device and may be applied to an electric vehicle and a power storage device, there emerges an interest in the secondary battery. Lithium ion batteries are in the spotlight as battery systems having the theoretically highest energy density among these secondary battery technologies, and are currently being used in various devices.

The lithium ion battery is composed of a positive electrode formed of a transition metal oxide containing lithium, a negative electrode formed of a carbon-based material, such as graphite, capable of storing lithium, an electrolyte solution that becomes a medium for transferring lithium ions, and a separator, and it is important to properly select these components in order to improve electrochemical properties of the battery.

The lithium ion battery has a disadvantage in that an increase in resistance and a decrease in capacity occur during charge and discharge or storage at high temperatures to degrade performance. One of causes of such a problem, which has been suggested, is a side reaction caused by deterioration of the electrolyte solution at high temperatures, particularly deterioration due to decomposition of a lithium salt.

$LiPF_6$ has been mainly been used as the lithium salt to obtain suitable characteristics of the secondary battery, wherein, since a $PF_6^-$ anion of the lithium salt is very vulnerable to heat, it is known that a Lewis acid, such as $PF_5^-$, is generated due to pyrolysis when the battery is exposed to high temperatures.

The $PF_5^-$ thus formed not only causes a decomposition reaction of an organic solvent such as ethylene carbonate, but also destructs a solid electrolyte interphase (SEI) formed on a surface of an active material, such as graphite, having an operating voltage outside an electrochemical stabilization window of the electrolyte solution to cause additional decomposition of the electrolyte solution and the resulting increase in resistance and degradation of lifetime of the battery.

Thus, various methods have been proposed for maintaining passivation ability of the SEI when exposed to heat and suppressing degradation behavior of the battery by scavenging $PF_5$ which is formed by the pyrolysis of the $LiPF_6$-based salt.

DISCLOSURE OF THE INVENTION

Technical Problem

An aspect of the present invention provides a non-aqueous electrolyte solution for a lithium secondary battery which includes an additive having an excellent effect of scavenging a decomposition product generated from a lithium salt in the electrolyte solution.

Another aspect of the present invention provides a lithium secondary battery in which an effect of improving high-temperature durability is improved by including the non-aqueous electrolyte solution for a lithium secondary battery.

Technical Solution

According to an aspect of the present invention, there is provided a non-aqueous electrolyte solution for a lithium secondary battery which includes:
a lithium salt;
an organic solvent;
a compound represented by Formula 1 as a first additive; and
lithium difluorophosphate (LiDFP) as a second additive.

[Formula 1]

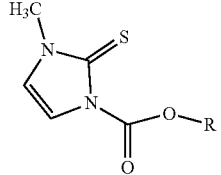

In Formula 1,
R is a substituted or unsubstituted alkyl group having 1 to 5 carbon atoms.

According to another aspect of the present invention, there is provided a lithium secondary battery including the non-aqueous electrolyte solution for a lithium secondary battery of the present invention.

Advantageous Effects

Since a non-aqueous electrolyte solution of the present invention includes a material capable of forming a solid electrolyte interphase (SEI) while being a Lewis base as a first additive, it may secure passivation ability of the SEI during high-temperature storage by scavenging a decomposition product formed by pyrolysis of a lithium salt and strengthening the SEI. Furthermore, since the non-aqueous electrolyte solution of the present invention combines a second additive having an excellent film-forming effect with the first additive, it may suppress initial resistance of a battery by forming a desired film on surfaces of a positive electrode and a negative electrode. Thus, if the non-aqueous electrolyte solution of the present invention is used, a lithium secondary battery having an improved high-temperature durability improvement effect may be prepared.

BRIEF DESCRIPTION OF THE DRAWINGS

FIG. 1 is a graph illustrating resistance increase rates after high-temperature (60° C.) storage of a secondary battery of Example 1 and a secondary battery of Comparative Example 1; and FIG. 2 is a graph illustrating resistance increase rates during 200 cycles at a high temperature (45° C.) of the secondary battery of Example 1 and the secondary battery of Comparative Example 1.

MODE FOR CARRYING OUT THE INVENTION

Hereinafter, the present invention will be described in more detail.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

With respect to a lithium secondary battery, high-temperature storage characteristics are improved by forming a film having passivation ability on surfaces of a positive electrode and a negative electrode while a non-aqueous electrolyte solution is decomposed during initial charge and discharge. However, the film may be degraded by an acid, such as $H^-$ and $PF_5^-$, formed by pyrolysis of a lithium salt ($LiPF_6$, etc.) widely used in a lithium ion battery. Since surface resistance of the electrode is increased due to a change in structure of the surface while dissolution of transition metal elements occurs in the positive electrode by attack of the acid and theoretical capacity is reduced as the metallic elements, as redox centers, are lost, capacity may be reduced. Also, since transition metal ions thus dissolved are electrodeposited on the negative electrode reacting in a strong reduction potential range to not only consume electrons, but also destruct the film when electrodeposited to expose the surface of the negative electrode, an additional electrolyte decomposition reaction is caused. As a result, resistance of the negative electrode is increased, and capacity of a cell may be continuously reduced while irreversible capacity is increased.

Thus, the present invention attempts to provide a non-aqueous electrolyte solution, which may strengthen a solid electrolyte interphase (SEI) on the surface of the negative electrode while preventing transition metal dissolution from the positive electrode or degradation of the SEI during high-temperature storage by scavenging the acid caused by the decomposition of the lithium salt by including an additive capable of forming the SEI while being a Lewis base-based compound as a component of the non-aqueous electrolyte solution, and a lithium secondary battery including the same.

Non-Aqueous Electrolyte Solution for Lithium Secondary Battery

First, a non-aqueous electrolyte solution for a lithium secondary battery according to the present invention will be described.

The non-aqueous electrolyte solution for a lithium secondary battery of the present invention includes (1) a lithium salt, (2) an organic solvent, (3) a compound represented by the following Formula 1 as a first additive, and (4) lithium difluorophosphate (LiDFP) as a second additive.

[Formula 1]

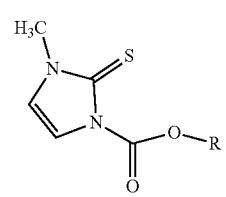

In Formula 1,
R is a substituted or unsubstituted alkyl group having 1 to 5 carbon atoms.

(1) Lithium Salt

First, in a non-aqueous electrolyte solution for a lithium secondary battery according to an embodiment of the present invention, any lithium salt typically used in an electrolyte solution for a lithium secondary battery may be used as the lithium salt without limitation, and, for example, the lithium salt may include $Li^+$ as a cation, and may include at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $B_{10}Cl_{10}^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $CH_3SO_3^-$, $CF_3(CF_2)_7SO_3^-$, $CF_3CO_2^-$, $CH_3CO_2^-$, $SCN^-$, and $(CF_3CF_2SO_2)_2N^-$ as an anion. Specifically, the lithium salt may include at least one selected from the group consisting of LiCl, LiBr, LiI, $LiBF_4$, $LiClO_4$, $LiAlO_4$, $LiAlCl_4$, $LiPF_6$, $LiSbF_6$, $LiAsF_6$, $LiB_{10}Cl_{10}$, $LiBOB(LiB(C_2O_4)_2)$, $LiCF_3SO_3$, LiTFSI ($LiN(SO_2CF_3)_2$), LiFSI($LiN(SO_2F)_2$), $LiCH_3SO_3$, $LiCF_3CO_2$, $LiCH_3CO_2$, and LiBETI ($LiN(SO_2CF_2CF_3)_2$). More specifically, the lithium salt may include a single material selected from the group consisting of $LiBF_4$, $LiClO_4$, $LiPF_6$, $LiBOB(LiB(C_2O_4)_2)$, $LiCF_3SO_3$, LiTFSI ($LiN(SO_2CF_3)_2$), LiFSI($LiN(SO_2F)_2$), and LiBETI ($LiN(SO_2CF_2CF_3)_2$), or a mixture of two or more thereof.

The lithium salt may be appropriately changed in a normally usable range, but may be included in a concentration of 0.8 M to 3.0 M, for example, 1.0 M to 3.0 M in the electrolyte solution to obtain an optimum effect of forming a film for preventing corrosion of a surface of an electrode.

If the concentration of the lithium salt is less than 0.8 M, since mobility of lithium ions is reduced, capacity characteristics may be degraded, and, if the concentration of the lithium salt is greater than 3.0 M, since viscosity of the non-aqueous electrolyte solution is excessively increased, electrolyte wetting may be reduced and a film-forming effect may be reduced.

(2) Organic Solvent

Various organic solvents typically used in a lithium electrolyte may be used as the organic solvent without limitation. For example, the organic solvent may include a cyclic carbonate-based organic solvent, a linear carbonate-based organic solvent, or a mixed organic solvent thereof.

The cyclic carbonate-based organic solvent is an organic solvent which may well dissociate the lithium salt in the electrolyte due to high permittivity as a highly viscous organic solvent, wherein specific examples of the cyclic carbonate-based organic solvent may be at least one organic solvent selected from the group consisting of ethylene carbonate (EC), propylene carbonate (PC), 1,2-butylene carbonate, 2,3-butylene carbonate, 1,2-pentylene carbonate, 2,3-pentylene carbonate, and vinylene carbonate, and, among them, the cyclic carbonate-based organic solvent may include ethylene carbonate.

Also, the linear carbonate-based organic solvent is an organic solvent having low viscosity and low permittivity, wherein typical examples of the linear carbonate-based organic solvent may be at least one organic solvent selected from the group consisting of dimethyl carbonate (DMC), diethyl carbonate (DEC), dipropyl carbonate, ethyl methyl carbonate (EMC), methylpropyl carbonate, and ethylpropyl carbonate, and the linear carbonate-based organic solvent may specifically include ethyl methyl carbonate (EMC).

In order to prepare an electrolyte solution having high ionic conductivity, the organic solvent may include the cyclic carbonate-based organic solvent and the linear carbonate-based organic solvent in a volume ratio of 1:9 to 5:5, for example, 2:8 to 4:6.

Furthermore, the organic solvent may further include a linear ester-based organic solvent and/or a cyclic ester-based organic solvent, which are typically used in an electrolyte solution for a lithium secondary battery, in the cyclic carbonate-based organic solvent and/or the linear carbonate-based organic solvent, if necessary.

As a specific example, the linear ester-based organic solvent may include at least one organic solvent selected from the group consisting of methyl acetate, ethyl acetate, propyl acetate, methyl propionate, ethyl propionate, propyl propionate, and butyl propionate.

As a specific example, the cyclic ester-based organic solvent may include at least one organic solvent selected from the group consisting of γ-butyrolactone, γ-valerolactone, γ-caprolactone, δ-valerolactone, and ε-caprolactone.

The organic solvent may be used by further mixing an ether-based organic solvent or a nitrile-based organic solvent, if necessary, in addition to the carbonate-based organic solvent or the ester-based organic solvent.

Any one selected from the group consisting of dimethyl ether, diethyl ether, dipropyl ether, methylethyl ether, methylpropyl ether, and ethylpropyl ether or a mixture of two or more thereof may be used as the ether-based solvent.

The nitrile-based solvent may include at least one selected from the group consisting of acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile.

(3) First Additive

The non-aqueous electrolyte solution of the present invention includes a compound represented by the following Formula 1 as a first additive.

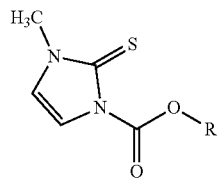

[Formula 1]

In Formula 1,

R is a substituted or unsubstituted alkyl group having 1 to 5 carbon atoms.

In Formula 1, R may be a substituted or unsubstituted alkyl group having 1 to 3 carbon atoms. Specifically, the compound represented by Formula 1 may be a compound represented by Formula 1a below.

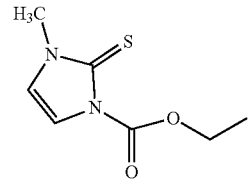

[Formula 1a]

The compound represented by Formula 1 may be included in an amount of 0.1 wt % to 5 wt %, particularly 0.1 wt % to 4 wt %, and more particularly 1 wt % to 3 wt % based on a total weight of the non-aqueous electrolyte solution.

In a case in which the amount of the compound represented by Formula 1 satisfies the above range, since an effect of scavenging a decomposition product of the lithium salt is excellent while suppressing disadvantages, such as a side reaction due to the additive, a decrease in capacity, and an increase in resistance, as much as possible, a secondary battery having more improved overall performance may be prepared.

If the amount of the first additive is less than 0.1 wt %, $HF^-$ or $PF_5^-$ may be scavenged, but the scavenging effect may be insignificant over time. Also, if the amount of the first additive is greater than 5.0 wt %, since the viscosity of the non-aqueous electrolyte solution may not only be increased due to the excessive amount of the additive, but ionic conductivity may also be reduced due to the increase in the viscosity to adversely affect mobility of ions in the battery, rate capability or low-temperature life characteristics may be degraded during high-temperature storage. In addition, resistance of the battery may be increased due to the decomposition of the excessive additive.

As described above, the non-aqueous electrolyte solution of the present invention may easily scavenge a by-product causing degradation of the battery at high temperatures, for example, a Lewis acid (e.g., $HF^-$ or $PF_5^-$) formed due to the decomposition of the lithium salt by including a Lewis base-based compound containing a C=S functional group like the compound represented by Formula 1. Thus, since a degradation behavior due to a chemical reaction of the film on the surface of the positive electrode or negative electrode, which is caused by the Lewis acid, may be suppressed, additional electrolyte solution decomposition of the battery due to the destruction of the film may be prevented, and, furthermore, high-temperature storage characteristics may be improved by mitigating self-discharge of the secondary battery.

Particularly, since the compound represented by Formula 1 included as the non-aqueous electrolyte solution additive has a double bond and a functional group of C=S bond, it may form a more robust SEI. That is, since the compound represented by Formula 1 of the present invention has the C=S bond, as an electron-rich functional group, instead of a C=O bond, an interface including sulfur (S) may be formed when the compound is reduced to form the SEI. Thus, initial resistance may be further reduced in comparison to a case where a compound represented by the following Formula 3 is included. Furthermore, since the compound represented by Formula 1 has a lower molecular weight than a compound containing an ionic bond, such as $SO_3^-$, which is represented by the following Formula 4, and has an ester bond, solubility in organic solvents used in a lithium ion battery is high, and thus, it has an advantage in that it is easier to function as an additive.

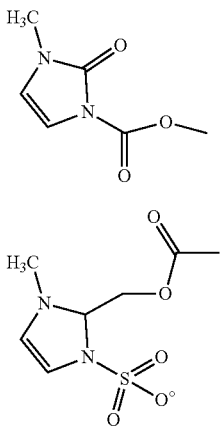

[Formula 3]

[Formula 4]

(4) Second Additive

The non-aqueous electrolyte solution of the present invention includes lithium difluorophosphate (LiDFP) represented by the following Formula 2 as a second additive.

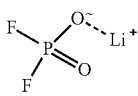

[Formula 2]

The lithium difluorophosphate (LiDFP) is a component for achieving an effect of improving long-term life characteristics of the secondary battery, wherein a lithium ion component formed by decomposition during initial charge is electrochemically decomposed on the surface of the negative electrode to form a stable SEI. The formation of the SEI may not only improve lithium (Li) mobility toward the negative electrode, but may also reduce interfacial resistance. Also, difluorophosphate anions formed by decomposition during initial charge may improve stabilization of the positive electrode and discharge characteristics while being present on the surface of the positive electrode. Thus, the effect of improving long-term life characteristics of the secondary battery may be achieved.

The lithium difluorophosphate (LiDFP), as the second additive, may be included in an amount of 0.1 wt % to 5 wt %, particularly 0.5 wt % to 3 wt %, and more particularly 1 wt % to 3 wt % based on the total weight of the non-aqueous electrolyte solution.

When the amount of the lithium difluorophosphate (LiDFP) satisfies the above range, a robust SEI-forming effect and a film-forming effect may be obtained.

If the amount of the lithium difluorophosphate (LiDFP) is greater than 5.0 wt %, since the viscosity of the electrolyte solution may not only be increased due to the surplus compound, but an excessively thick film may also be formed on the surface of the electrode to cause an increase in resistance and degradation of capacity characteristics. If the amount of the lithium difluorophosphate (LiDFP) is less than 0.1 wt %, the film-forming effect on the surface of the electrode may be insignificant.

A weight ratio of the first additive to the second additive in the non-aqueous electrolyte solution of the present invention may be in a range of 1:1 to 1:10, particularly 1:1 to 1:5, and more particularly 1:1 to 1:3.

In a case in which the first additive and the second additive are mixed in the above ratio, wetting of the electrolyte solution may be improved by reducing surface tension. Also, a side reaction between the electrode and the electrolyte solution may be suppressed during charge at high temperatures by forming a stable SEI without an increase in resistance.

If, in a case in which the weight ratio of the second additive to the first additive is greater than 10, since initial interfacial resistance is increased while an excessively thick film is formed on the surface of the electrode, output may be reduced. Also, in a case in which the weight ratio of the second additive to the first additive is less than 1, since an SEI-forming effect is insignificant, an effect of suppressing the side reaction between the electrode and the electrolyte solution may be reduced.

(5) Additional Additives

Also, in order to prevent the non-aqueous electrolyte solution from being decomposed to cause collapse of the negative electrode in a high-output environment, or further improve low-temperature high-rate discharge characteristics, high-temperature stability, overcharge protection, and a battery swelling suppression effect at high temperatures, the non-aqueous electrolyte solution for a lithium secondary battery of the present invention may further include additional third additives in the non-aqueous electrolyte solution, if necessary.

As a typical example, these third additives may include at least one additive selected from the group consisting of a cyclic carbonate-based compound, a halogen-substituted carbonate-based compound, a sultone-based compound, a sulfate-based compound, a phosphate-based compound, a borate-based compound, a nitrile-based compound, a benzene-based compound, an amine-based compound, a silane-based compound, and a lithium salt-based compound.

The cyclic carbonate-based compound may include vinylene carbonate (VC) or vinyl ethylene carbonate.

The halogen-substituted carbonate-based compound may include fluoroethylene carbonate (FEC).

The sultone-based compound may include at least one compound selected from the group consisting of 1,3-propane sultone (PS), 1,4-butane sultone, ethane sultone, 1,3-propene sultone (PRS), 1,4-butene sultone, and 1-methyl-1,3-propene sultone.

The sulfate-based compound may include ethylene sulfate (Esa), trimethylene sulfate (TMS), or methyl trimethylene sulfate (MTMS).

The phosphate-based compound may include at least one compound selected from the group consisting of lithium difluorobis(oxalato)phosphate, tris(trimethylsilyl) phosphate, tis(trimethylsilyl) phosphite, tris(2,2,2-trifluoroethyl) phosphate, and tris(trifluoroethyl)phosphite, in addition to the lithium difluorophosphate included as the second additive.

The borate-based compound may include tetraphenylborate and lithium oxalyldifluoroborate.

The nitrile-based compound may include at least one compound selected from the group consisting of succinonitrile, adiponitrile, acetonitrile, propionitrile, butyronitrile, valeronitrile, caprylonitrile, heptanenitrile, cyclopentanecarbonitrile, cyclohexanecarbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile.

The benzene-based compound may include fluorobenzene, the amine-based compound may include triethanolamine or ethylenediamine, and the silane-based compound may include tetravinylsilane.

The lithium salt-based compound is a compound different from the lithium salt included in the non-aqueous electrolyte solution, wherein the lithium salt-based compound may include at least one compound selected from the group consisting of $LiPO_2F_2$, LiODFB, LiBOB (lithium bis (oxalato) borate ($LiB(C_2O_4)_2$)), and $LiBF_4$.

In a case in which, among these additional additives, vinylene carbonate, vinyl ethylene carbonate, or succinonitrile is included, a more robust SEI may be formed on the surface of the negative electrode during an initial activation process of the secondary battery.

In a case in which the $LiBF_4$ is included, high-temperature stability of the secondary battery may be improved by suppressing generation of a gas which may be generated due to the decomposition of the electrolyte solution at high temperatures.

The third additive may be used as a mixture of two or more thereof, and may be included in an amount of 0.01 wt % to 50 wt %, particularly 0.01 wt % to 10 wt %, and preferably 0.05 wt % to 5 wt % based on the total weight of the non-aqueous electrolyte solution. If the amount of the additional additive is less than 0.01 wt %, effects of improving low-temperature output, high-temperature storage characteristics, and high-temperature life characteristics of the battery are insignificant, and, if the amount of the additional additive is greater than 50 wt %, there is a possibility that the side reaction in the electrolyte solution occurs excessively during charge and discharge of the battery. Particularly, since the third additive may not be sufficiently decomposed at high temperatures when an excessive amount of the third additive is added, the third additive may be present in the form of an unreacted material or precipitates in the electrolyte solution at room temperature. Accordingly, a side reaction may occur in which life or resistance characteristics of the secondary battery are degraded.

Lithium Secondary Battery

Also, in another embodiment of the present invention, there is provided a lithium secondary battery including the non-aqueous electrolyte solution for a lithium secondary battery of the present invention.

The lithium secondary battery of the present invention may be prepared by forming an electrode assembly, in which a positive electrode, a negative electrode, and a separator disposed between the positive electrode and the negative electrode are sequentially stacked, accommodating the electrode assembly in a battery case, and then injecting the non-aqueous electrolyte solution of the present invention.

A typical method known in the art may be used as a method of preparing the lithium secondary battery of the present invention, and, specifically, the method of preparing the lithium secondary battery of the present invention is as described below.

(1) Positive Electrode

The positive electrode may be prepared by coating a positive electrode collector with a positive electrode slurry including a positive electrode active material, a binder, a conductive agent, and a solvent, and then drying and rolling the coated positive electrode collector.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The positive electrode active material is a compound capable of reversibly intercalating and deintercalating lithium, wherein the positive electrode active material may include a lithium transition metal oxide including lithium and at least one metal selected from cobalt, manganese, nickel, or aluminum, and may specifically include at least one selected from lithium-manganese-based oxide with high stability and capacity characteristics of the battery, lithium iron phosphate, and lithium-nickel-manganese-cobalt-based oxide (e.g., $Li(Ni_pCo_qMn_{r1})O_2$ (where $0<p<1$, $0<q<1$, $0<r1<1$, and $p+q+r1=1$).

Specifically, the lithium-manganese-based oxide may include $LiMn_2O_4$, and the lithium iron phosphate may, for example, include $LiFePO_4$.

Also, the lithium-nickel-manganese-cobalt-based oxide may include at least one selected from $Li(Ni_{1/3}Mn_{1/3}Co_{1/3})O_2$, $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, and $Li(Ni_{0.8}Mn_{0.1}Co_{0.1})O_2$), wherein, among them, it is desirable that the lithium-nickel-manganese-cobalt-based oxide includes a lithium transition metal oxide in which an amount of nickel among transition metals is 60 atm % or more. That is, since the higher the amount of the nickel among the transition metals is the higher the capacity may be achieved, it is more advantageous in using the lithium transition metal oxide having a nickel content of 60 atm % or more to achieve high capacity. That is, the lithium transition metal oxide may include at least one selected from the group consisting of $Li(Ni_{0.6}Mn_{0.2}Co_{0.2})O_2$, $Li(Ni_{0.7}Mn_{0.15}Co_{0.15})O_2$, and $Li(Ni_{0.8}Mn_{0.1}Co_{0.1})O_2$).

In addition to the above lithium transition metal oxide, the positive electrode active material of the present invention may further include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where $0<Y<1$), $LiMn_{2-Z}Ni_ZO_4$ (where $0<Z<2$)), lithium-nickel-cobalt-based oxide (e.g., $LiNi_{1-Y1}Co_{Y1}O_2$ (where $0<Y1<1$)), lithium-manganese-cobalt-based oxide (e.g., $LiCo_{1-Y2}Mn_{Y2}O_2$ (where $0<Y2<1$), $LiMn_{2-Z1}Co_{Z1}O_4$ (where $0<Z1<2$)), lithium-nickel-manganese-cobalt-based oxide (e.g., $Li(Ni_pCo_qMn_{r1})O_2$ (where $0<p<1$, $0<q<1$, $0<r1<1$, and $p+q+r1=1$) or $Li(Ni_{p1}Co_{q1}Mn_{r2})O_4$ (where $0<p1<2$, $0<q1<2$, $0<r2<2$, and $p1+q1+r2=2$)), or lithium-nickel-cobalt-transition metal (M) oxide (e.g., $Li(Ni_{p2}Co_{q2}Mn_{r3}M_{S2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein $0<p2<1$, $0<q2<1$, $0<r3<1$, $0<S2<1$, and $p2+q2+r3+S2=1$), and any one thereof or a compound of two or more thereof may be further included.

The positive electrode active material may be included in an amount of 80 wt % to 99 wt %, for example, 90 wt % to 99 wt % based on a total weight of solid content in the positive electrode slurry. In a case in which the amount of the positive electrode active material is 80 wt % or less, since energy density is reduced, capacity may be reduced.

The binder is a component that assists in the binding between the active material and the conductive agent and in the binding with the current collector, wherein the binder is commonly added in an amount of 1 wt % to 30 wt % based on the total weight of the solid content in the positive electrode slurry. Examples of the binder may be polyvinylidene fluoride, polyvinyl alcohol, carboxymethylcellulose (CMC), starch, hydroxypropylcellulose, regenerated cellulose, polyvinylpyrrolidone, polytetrafluoroethylene, polyethylene, polypropylene, an ethylene-propylene-diene termonomer, a styrene-butadiene rubber, a fluoro rubber, various copolymers, and the like.

Also, the conductive agent is a material providing conductivity without causing adverse chemical changes in the battery, wherein it may be added in an amount of 1 wt % to 20 wt % based on the total weight of the solid content in the positive electrode slurry.

As a typical example of the conductive agent, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; conductive powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

Furthermore, the solvent may include an organic solvent, such as N-methyl-2-pyrrolidone (NMP), and may be used in an amount such that desirable viscosity is obtained when the positive electrode active material as well as optionally the binder and the conductive agent are included. For example, the solvent may be included in an amount such that a concentration of the solid content in the slurry including the positive electrode active material as well as optionally the binder and the conductive agent is in a range of 10 wt % to 60 wt %, for example, 20 wt % to 50 wt %.

(2) Negative Electrode

The negative electrode may be prepared by coating a negative electrode collector with a negative electrode slurry including a negative electrode active material, a binder, a conductive agent, and a solvent, and then drying and rolling the coated negative electrode collector.

The negative electrode collector generally has a thickness of 3 μm to 500 μm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

Furthermore, the negative electrode active material may include at least one selected from the group consisting of lithium metal, a carbon material capable of reversibly intercalating/deintercalating lithium ions, metal or an alloy of lithium and the metal, a metal composite oxide, a material which may be doped and undoped with lithium, and a transition metal oxide.

As the carbon material capable of reversibly intercalating/deintercalating lithium ions, a carbon-based negative electrode active material generally used in a lithium ion secondary battery may be used without particular limitation, and, as a typical example, crystalline carbon, amorphous carbon, or both thereof may be used. Examples of the crystalline carbon may be graphite such as irregular, planar, flaky, spherical, or fibrous natural graphite or artificial graphite, and examples of the amorphous carbon may be soft carbon (low-temperature sintered carbon) or hard carbon, mesophase pitch carbide, and fired cokes.

As the metal or the alloy of lithium and the metal, a metal selected from the group consisting of copper (Cu), nickel (Ni), sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn), or an alloy of lithium and the metal may be used.

One selected from the group consisting of PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, $Li_xFe_2O_3$ ($0 \leq x \leq 1$), $Li_xWO_2$ ($0 \leq x \leq 1$), and $Sn_xMe_{1-x}Me'_yO_z$ (Me: manganese (Mn), Fe, Pb, or Ge; Me': Al, boron (B), phosphorus (P), Si, Groups I, II and III elements of the periodic table, or halogen; $0 < x \leq 1$; $1 \leq y \leq 3$; $1 \leq z \leq 8$) may be used as the metal composite oxide.

The material, which may be doped and undoped with lithium, may include Si, $SiO_x$ ($0 < x \leq 2$), a Si—Y alloy (where Y is an element selected from the group consisting of alkali metal, alkaline earth metal, a Group 13 element, a Group 14 element, transition metal, a rare earth element, and a combination thereof, and is not Si), Sn, $SnO_2$, and Sn—Y (where Y is an element selected from the group consisting of alkali metal, alkaline earth metal, a Group 13 element, a Group 14 element, transition metal, a rare earth element, and a combination thereof, and is not Sn), and a mixture of $SiO_2$ and at least one thereof may also be used. The element Y may be selected from the group consisting of Mg, Ca, Sr, Ba, Ra, scandium (Sc), yttrium (Y), Ti, zirconium (Zr), hafnium (Hf), rutherfordium (Rf), V, niobium (Nb), Ta, dubnium (db), Cr, Mo, tungsten (W), seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), Cu, silver (Ag), gold (Au), Zn, cadmium (Cd), B, Al, gallium (Ga), Sn, In, Ge, P, arsenic (As), Sb, bismuth (Bi), sulfur (S), selenium (Se), tellurium (Te), polonium (Po), and a combination thereof.

The transition metal oxide may include lithium-containing titanium composite oxide (LTO), vanadium oxide, and lithium vanadium oxide.

The negative electrode active material may be included in an amount of 80 wt % to 99 wt % based on a total weight of solid content in the negative electrode slurry.

The binder is a component that assists in the binding between the conductive agent, the active material, and the current collector, wherein the binder is commonly added in an amount of 1 wt % to 30 wt % based on the total weight of the solid content in the negative electrode slurry. Examples of the binder may be polyvinylidene fluoride, polyvinyl alcohol, carboxymethylcellulose (CMC), starch, hydroxypropylcellulose, regenerated cellulose, polyvinylpyrrolidone, polytetrafluoroethylene, polyethylene, polypropylene, an ethylene-propylene-diene monomer, a styrene-butadiene rubber, and a fluoro rubber.

The conductive agent is a component for further improving the conductivity of the negative electrode active material, wherein the conductive agent may be added in an amount of 1 wt % to 20 wt % based on the total weight of the solid content in the negative electrode slurry. Any conductive agent may be used without particular limitation so long as it has conductivity without causing adverse chemical changes in the battery, and, for example, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The solvent may include water or an organic solvent, such as NMP and alcohol, and may be used in an amount such that desirable viscosity is obtained when the negative electrode active material as well as optionally the binder and the conductive agent are included. For example, the solvent may be included in an amount such that a concentration of the solid content in the slurry including the negative electrode active material as well as optionally the binder and the conductive agent is in a range of 50 wt % to 75 wt %, for example, 50 wt % to 65 wt %.

(3) Separator

A typical porous polymer film generally used, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator included in the lithium secondary battery of the present invention, and a typical porous nonwoven fabric, for example, a nonwoven fabric formed of high melting point glass fibers or polyethylene terephthalate fibers may be used, but the present invention is not limited thereto.

A shape of the lithium secondary battery of the present invention is not particularly limited, but a cylindrical type using a can, a prismatic type, a pouch type, or a coin type may be used.

Hereinafter, the present invention will be described in more detail according to examples. However, the invention may be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

Preparation of Non-Aqueous Electrolyte Solution for Lithium Secondary Battery

A non-aqueous electrolyte solution for a lithium secondary battery was prepared by adding 0.5 g of the compound represented by Formula 1a as a first additive, 1.0 g of lithium difluorophosphate as a second additive, and 0.1 g of tetravinyl silane, 1.0 g of ethylene sulfonate, 0.5 g of 1,3-propane sultone, 0.2 g of $LiBF_4$, and 6.0 g of fluorobenzene, as a third additive, to 90.7 g of an organic solvent (ethylene carbonate:ethyl methyl carbonate=3:7 volume ratio) in which 0.7 M $LiPF_6$ and 0.3 M LiFSI were dissolved.

Secondary Battery Preparation

A positive electrode active material ($Li(Ni_{0.8}Co_{0.1}Mn_{0.1})O_2$:$Li(Ni_{0.6}Co_{0.2}Mn_{0.2})O_2$=7:3 weight ratio), carbon black as a conductive agent, and polyvinylidene fluoride, as a binder, were added to N-methyl-2-pyrrolidone (NMP), as a solvent, at a weight ratio of 97.5:1:1.5 to prepare a positive electrode slurry (solid content: 50 wt %). A 15 μm thick positive electrode collector (Al thin film) was coated with the positive electrode slurry, dried, and then roll-pressed to prepare a positive electrode.

A negative electrode active material (graphite:SiO=95:5 weight ratio), a binder (SBR-CMC), and a conductive agent (carbon black) were added in a weight ratio of 95:3.5:1.5 to water, as a solvent, to prepare a negative electrode slurry (solid content: 60 wt %). A 6 μm thick copper (Cu) thin film, as a negative electrode collector, was coated with the negative electrode slurry, dried, and then roll-pressed to prepare a negative electrode.

An electrode assembly was prepared by sequentially stacking the positive electrode, a polyolefin-based porous separator coated with inorganic particles ($Al_2O_3$), and the negative electrode.

The electrode assembly prepared was accommodated in a battery case, and the non-aqueous electrolyte solution for a lithium secondary battery was injected thereinto to prepare a lithium secondary battery.

Example 2

Preparation of Non-Aqueous Electrolyte Solution for Lithium Secondary Battery

A non-aqueous electrolyte solution for a lithium secondary battery was prepared by adding 0.2 g of the compound represented by Formula 1a as a first additive, 1.0 g of lithium difluorophosphate as a second additive, and 1.0 g of ethylene sulfonate, 0.5 g of 1,3-propane sultone, 0.2 g of $LiBF_4$, and 6.0 g of fluorobenzene, as a third additive, to 91.1 g of an organic solvent (ethylene carbonate:ethyl methyl carbonate=3:7 volume ratio) in which 0.7 M $LiPF_6$ and 0.3 M LiFSI were dissolved.

Secondary Battery Preparation

A positive electrode active material ($Li(Ni_{0.8}Co_{0.1}Mn_{0.1})O_2$), carbon black as a conductive agent, and polyvinylidene fluoride, as a binder, were added to N-methyl-2-pyrrolidone (NMP), as a solvent, at a weight ratio of 97.5:1:1.5 to prepare a positive electrode slurry (solid content: 50 wt %). A 15 μm thick positive electrode collector (Al thin film) was coated with the positive electrode slurry, dried, and then roll-pressed to prepare a positive electrode.

A negative electrode active material (graphite:SiO=95:5 weight ratio), a binder (SBR-CMC), and a conductive agent (carbon black) were added in a weight ratio of 95:3.5:1.5 to water, as a solvent, to prepare a negative electrode slurry (solid content: 60 wt %). A 6 μm thick copper (Cu) thin film, as a negative electrode collector, was coated with the negative electrode slurry, dried, and then roll-pressed to prepare a negative electrode.

An electrode assembly was prepared by sequentially stacking the positive electrode, a polyolefin-based porous separator coated with inorganic particles ($Al_2O_3$), and the negative electrode.

The electrode assembly prepared was accommodated in a battery case, and the non-aqueous electrolyte solution for a lithium secondary battery was injected thereinto to prepare a lithium secondary battery.

Example 3

Preparation of Non-Aqueous Electrolyte Solution for Lithium Secondary Battery A non-aqueous electrolyte solution for a lithium secondary battery was prepared by adding 0.3 g of the compound represented by Formula 1a as a first additive, 1.0 g of lithium difluorophosphate as a second additive, and 1.0 g of ethylene sulfonate, 0.5 g of 1,3-propane sultone, 0.2 g of $LiBF_4$, and 6.0 g of fluorobenzene, as a third additive, to 91.0 g of an organic solvent (ethylene carbonate:ethyl methyl carbonate=3:7 volume ratio) in which 1.2 M $LiPF_6$ was dissolved.

Secondary Battery Preparation

A positive electrode active material ($Li(Ni_{0.8}Co_{0.1}Mn_{0.1})O_2$), carbon black as a conductive agent, and polyvinylidene fluoride, as a binder, were added to N-methyl-2-pyrrolidone (NMP), as a solvent, at a weight ratio of 97.5:1:1.5 to prepare a positive electrode slurry (solid content: 50 wt %). A 15 μm thick positive electrode collector (Al thin film) was coated with the positive electrode slurry, dried, and then roll-pressed to prepare a positive electrode.

A negative electrode active material (graphite), a binder (SBR-CMC), and a conductive agent (carbon black) were added in a weight ratio of 95:3.5:1.5 to water, as a solvent, to prepare a negative electrode slurry (solid content: 60 wt %). A 6 μm thick copper (Cu) thin film, as a negative electrode collector, was coated with the negative electrode slurry, dried, and then roll-pressed to prepare a negative electrode.

An electrode assembly was prepared by sequentially stacking the positive electrode, a polyolefin-based porous separator coated with inorganic particles ($Al_2O_3$), and the negative electrode.

The electrode assembly prepared was accommodated in a battery case, and the non-aqueous electrolyte solution for a lithium secondary battery was injected thereinto to prepare a lithium secondary battery.

Example 4

Preparation of Non-Aqueous Electrolyte Solution for Lithium Secondary Battery A non-aqueous electrolyte solution for a lithium secondary battery was prepared by adding 0.3 g of the compound represented by Formula 1a as a first additive, 1.5 g of lithium difluorophosphate as a second additive, and 1.0 g of ethylene sulfonate and 0.5 g of 1,3-propane sultone, as a third additive, to 96.7 g of an organic solvent (ethylene carbonate:ethyl methyl carbonate=3:7 volume ratio) in which 1.2 M $LiPF_6$ was dissolved.

Secondary Battery Preparation

A secondary battery was prepared in the same manner as in Example 3 except that the above-prepared non-aqueous electrolyte solution for a lithium secondary battery, instead of the non-aqueous electrolyte solution for a lithium secondary battery of Example 3, was injected.

Comparative Example 1

Preparation of Non-Aqueous Electrolyte Solution for Lithium Secondary Battery A non-aqueous electrolyte solution for a lithium secondary battery was prepared by adding 1.0 g of lithium difluorophosphate, as a second additive, and 0.1 g of tetravinyl silane, 1.0 g of ethylene sulfonate, 0.5 g of 1,3-propane sultone, 0.2 g of $LiBF_4$, and 6.0 g of fluorobenzene, as a third additive, to 91.2 g of an organic solvent (ethylene carbonate: ethyl methyl carbonate=3:7 volume ratio) in which 0.7 M $LiPF_6$ and 0.3 M LiFSI were dissolved.

Secondary Battery Preparation

A positive electrode active material ($Li(Ni_{0.8}Co_{0.1}Mn_{0.1})O_2$:$Li(Ni_{0.6}Co_{0.2}Mn_{0.2})O_2$=7:3 weight ratio), carbon black as a conductive agent, and polyvinylidene fluoride, as a binder, were added to N-methyl-2-pyrrolidone (NMP), as a solvent, at a weight ratio of 97.5:1:1.5 to prepare a positive electrode slurry (solid content: 50 wt %). A 15 μm thick positive electrode collector (Al thin film) was coated with the positive electrode slurry, dried, and then roll-pressed to prepare a positive electrode.

A negative electrode active material (graphite:SiO=95:5 weight ratio), a binder (SBR-CMC), and a conductive agent (carbon black) were added in a weight ratio of 95:3.5:1.5 to water, as a solvent, to prepare a negative electrode slurry (solid content: 60 wt %). A 6 μm thick copper (Cu) thin film, as a negative electrode collector, was coated with the negative electrode slurry, dried, and then roll-pressed to prepare a negative electrode.

An electrode assembly was prepared by sequentially stacking the positive electrode, a polyolefin-based porous separator coated with inorganic particles ($Al_2O_3$), and the negative electrode.

The electrode assembly prepared was accommodated in a battery case, and the non-aqueous electrolyte solution for a lithium secondary battery was injected thereinto to prepare a lithium secondary battery.

Comparative Example 2

Secondary Battery Preparation

A positive electrode active material ($Li(Ni_{0.8}Co_{0.1}Mn_{0.1})O_2$), carbon black as a conductive agent, and polyvinylidene fluoride, as a binder, were added to N-methyl-2-pyrrolidone (NMP), as a solvent, at a weight ratio of 97.5:1:1.5 to prepare a positive electrode slurry (solid content: 50 wt %). A 15 μm thick positive electrode collector (Al thin film) was coated with the positive electrode slurry, dried, and then roll-pressed to prepare a positive electrode.

A negative electrode active material (graphite:SiO=95:5 weight ratio), a binder (SBR-CMC), and a conductive agent (carbon black) were added in a weight ratio of 95:3.5:1.5 to water, as a solvent, to prepare a negative electrode slurry (solid content: 60 wt %). A 6 μm thick copper (Cu) thin film, as a negative electrode collector, was coated with the negative electrode slurry, dried, and then roll-pressed to prepare a negative electrode.

An electrode assembly was prepared by sequentially stacking the positive electrode, a polyolefin-based porous separator coated with inorganic particles ($Al_2O_3$), and the negative electrode.

The electrode assembly prepared was accommodated in a battery case, and the non-aqueous electrolyte solution for a lithium secondary battery prepared in Comparative Example 1 was injected thereinto to prepare a lithium secondary battery.

Comparative Example 3

Preparation of Non-Aqueous Electrolyte Solution for Lithium Secondary Battery A non-aqueous electrolyte solution for a lithium secondary battery was prepared by adding 1.0 g of lithium difluorophosphate, as a second additive, and 0.1 g of tetravinyl silane (TVS), 1.0 g of ethylene sulfonate, 0.5 g of 1,3-propane sultone, 0.2 g of $LiBF_4$, and 6.0 g of fluorobenzene, as a third additive, to 91.2 g of an organic solvent (ethylene carbonate:ethyl methyl carbonate=3:7 volume ratio) in which 1.2 M $LiPF_6$ was dissolved.

Secondary Battery Preparation

A positive electrode active material ($Li(Ni_{0.8}Co_{0.1}Mn_{0.1})O_2$), carbon black as a conductive agent, and polyvinylidene fluoride, as a binder, were added to N-methyl-2-pyrrolidone (NMP), as a solvent, at a weight ratio of 97.5:1:1.5 to prepare a positive electrode slurry (solid content: 50 wt %). A 15 μm thick positive electrode collector (Al thin film) was coated with the positive electrode slurry, dried, and then roll-pressed to prepare a positive electrode.

A negative electrode active material (graphite), a binder (SBR-CMC), and a conductive agent (carbon black) were added in a weight ratio of 95:3.5:1.5 to water, as a solvent, to prepare a negative electrode slurry (solid content: 60 wt %). A 6 μm thick copper (Cu) thin film, as a negative electrode collector, was coated with the negative electrode slurry, dried, and then roll-pressed to prepare a negative electrode.

An electrode assembly was prepared by sequentially stacking the positive electrode, a polyolefin-based porous separator coated with inorganic particles ($Al_2O_3$), and the negative electrode.

The electrode assembly prepared was accommodated in a battery case, and the non-aqueous electrolyte solution for a lithium secondary battery was injected thereinto to prepare a lithium secondary battery.

Comparative Example 4

Preparation of Non-Aqueous Electrolyte Solution for Lithium Secondary Battery A non-aqueous electrolyte solution for a lithium secondary battery was prepared by adding 1.5 g of lithium difluorophosphate, as a second additive, and 1.0 g of ethylene sulfonate and 0.5 g of 1,3-propane sultone, as a third additive, to 97 g of an organic solvent (ethylene carbonate: ethyl methyl carbonate=3:7 volume ratio) in which 1.2 M $LiPF_6$ was dissolved.

Secondary Battery Preparation

A secondary battery was prepared in the same manner as in Example 3 except that the above-prepared non-aqueous electrolyte solution for a lithium secondary battery, instead of the non-aqueous electrolyte solution for a lithium secondary battery of Example 3, was injected.

EXPERIMENTAL EXAMPLES

Experimental Example 1-1: High-Temperature (60° C.) Storage Durability Evaluation (1)

After each of the lithium secondary batteries prepared in Example 1 and Comparative Example 1 was activated at a CC of 0.1 C, degassing was performed.

Thereafter, each lithium secondary battery was charged at 0.33 C rate to 4.20 V under a constant current-constant voltage (CC-CV) condition at 25° C., then subjected to 0.05 C current cut-off, and discharged at 0.33 C rate under a constant current condition to 2.5 V. After the above charging and discharging were defined as one cycle and three cycles were performed, each lithium secondary battery was charged to a state of charge (SOC) of 50%, and initial resistance was then calculated by a voltage drop obtained in a state in which each lithium secondary battery was subjected to a discharge pulse at 2.5 C for 10 seconds. The voltage drop was measured using PNE-0506 charge/discharge equipment (manufacturer: PNE SOLUTION Co., Ltd., 5 V, 6 A).

Then, each lithium secondary battery was recharged at a CC of 0.33 C to a state of charge (SOC) of 100% and then stored at a high temperature (60° C.) for 13 weeks.

After every 2 weeks, 4 weeks, 8 weeks, 10 weeks, and 13 weeks, each lithium secondary battery was charged to a state of charge (SOC) of 50%, and resistance (DC-iR) after storage was then calculated by a voltage drop obtained in a state in which each lithium secondary battery was subjected to a discharge pulse at 2.5 C for 10 seconds. The voltage drop was measured using PNE-0506 charge/discharge equipment (manufacturer: PNE SOLUTION Co., Ltd., 5 V, 6 A).

The calculated initial resistance and the resistance after high-temperature storage measured every week were substituted into the following [Equation 1] to calculate a resistance increase rate (%), and the results thereof are then presented in FIG. 1.

Resistance increase rate (%)={(resistance after high-temperature storage-initial resistance)/initial resistance}×100    [Equation 1]

Referring to FIG. 1, it may be understood that a resistance increase rate after high-temperature storage of the secondary battery of Example 1 was significantly improved in comparison to that of Comparative Example 1.

Experimental Example 1-2: High-Temperature (60° C.) Storage Durability Evaluation (2)

After each of the secondary battery prepared in Example 2 and the lithium secondary battery prepared in Comparative Example 2 was activated at a CC of 0.1 C, degassing was performed.

Thereafter, each lithium secondary battery was charged at 0.33 C rate to 4.20 V under a constant current-constant voltage (CC-CV) condition at 25° C., then subjected to 0.05 C current cut-off, and discharged at 0.33 C rate under a constant current condition to 2.5 V. After the above charging and discharging were defined as one cycle and three cycles were performed, initial discharge capacity was measured using PNE-0506 charge/discharge equipment (manufacturer: PNE SOLUTION Co., Ltd., 5 V, 6 A). Then, after each lithium secondary battery was charged to a state of charge (SOC) of 50%, initial resistance was calculated by a voltage drop obtained in a state in which each lithium secondary battery was subjected to a discharge pulse at 2.5 C for 10 seconds. The voltage drop was measured using PNE-0506 charge/discharge equipment (manufacturer: PNE SOLUTION Co., Ltd., 5 V, 6 A).

Subsequently, each lithium secondary battery was recharged at a CC of 0.33 C to a state of charge (SOC) of 100% and then stored at a high temperature (60° C.) for 2 weeks.

After CC-CV charge and discharge were performed at a CC of 0.33 C after 2 weeks, discharge capacity after high-temperature storage was measured using PNE-0506 charge/discharge equipment (manufacturer: PNE SOLUTION Co., Ltd., 5 V, 6 A). Also, after each lithium secondary battery was charged to a state of charge (SOC) of 50%, resistance (DC-iR) after high-temperature storage was calculated by a voltage drop obtained in a state in which each lithium secondary battery was subjected to a discharge pulse at 2.5 C for 10 seconds. In this case, the voltage drop was measured using PNE-0506 charge/discharge equipment (manufacturer: PNE SOLUTION Co., Ltd., 5 V, 6 A).

The calculated initial resistance and the resistance after 2 weeks high-temperature storage were substituted into [Equation 1] to calculate a resistance increase rate (%), and the results thereof are then presented in Table 1 below.

Furthermore, the initial discharge capacity and the discharge capacity after 2 weeks high-temperature storage were substituted into the following [Equation 2] to calculate a capacity retention (%), and the results thereof are then presented in Table 1 below.

Discharge capacity retention (%)=(discharge capacity after high-temperature storage/initial discharge capacity)×100     [Equation 2]

TABLE 1

|  | After 2 weeks of high-temperature (60° C.) storage | |
| --- | --- | --- |
|  | Capacity retention (%) | Resistance increase rate (%) |
| Example 2 | 92.30 | 4.53 |
| Comparative Example 2 | 91.49 | 5.69 |

Referring to Table 1, it may be understood that a resistance increase rate after high-temperature storage and a capacity retention of the secondary battery of Example 2 were improved in comparison to those of Comparative Example 2.

Experimental Example 1-3: High-Temperature (60° C.) Storage Durability Evaluation (3)

After each of the secondary battery prepared in Example 3 and the lithium secondary battery prepared in Comparative Example 3 was activated at a CC of 0.1 C, degassing was performed.

Thereafter, each lithium secondary battery was charged at 0.33 C rate to 4.20 V under a constant current-constant voltage (CC-CV) condition at 25° C., then subjected to 0.05 C current cut-off, and discharged at 0.33 C rate under a constant current condition to 2.5 V. After the above charging and discharging were defined as one cycle and three cycles were performed, initial discharge capacity was measured using PNE-0506 charge/discharge equipment (manufacturer: PNE SOLUTION Co., Ltd., 5 V, 6 A). Then, after each lithium secondary battery was charged to a state of charge (SOC) of 50%, initial resistance was calculated by a voltage drop obtained in a state in which each lithium secondary battery was subjected to a discharge pulse at 2.5 C for 10 seconds. In this case, the voltage drop was measured using PNE-0506 charge/discharge equipment (manufacturer: PNE SOLUTION Co., Ltd., 5 V, 6 A).

Subsequently, each lithium secondary battery was recharged at a CC of 0.33 C to a state of charge (SOC) of 100% and then stored at a high temperature (60° C.) for 4 weeks.

After CC-CV charge and discharge were performed at a CC of 0.33 C after 4 weeks, discharge capacity after high-temperature storage was measured using PNE-0506 charge/discharge equipment (manufacturer: PNE SOLUTION Co., Ltd., 5 V, 6 A). Also, after each lithium secondary battery was charged to a state of charge (SOC) of 50%, resistance (DC-iR) after high-temperature storage was calculated by a voltage drop obtained in a state in which each lithium secondary battery was subjected to a discharge pulse at 2.5 C for 10 seconds. In this case, the voltage drop was measured using PNE-0506 charge/discharge equipment (manufacturer: PNE SOLUTION Co., Ltd., 5 V, 6 A).

The calculated initial resistance and the resistance after 4 weeks high-temperature storage were substituted into [Equation 1] to calculate a resistance increase rate (%), and the results thereof are then presented in Table 2 below.

Furthermore, the measured initial discharge capacity and the discharge capacity after 4 weeks high-temperature storage were substituted into [Equation 2] to calculate a capacity retention (%), and the results thereof are then presented in Table 2 below.

TABLE 2

|  | After 4 weeks of high-temperature (60° C.) storage | |
| --- | --- | --- |
|  | Capacity retention (%) | Resistance increase rate (%) |
| Example 3 | 99.97 | −3.81 |
| Comparative Example 3 | 98.99 | 4.19 |

Referring to Table 2, it may be understood that a resistance increase rate after high-temperature storage and a capacity retention of the secondary battery of Example 3 were significantly improved in comparison to those of Comparative Example 3, respectively.

Experimental Example 1-4: High-Temperature (60° C.) Storage Durability Evaluation (4)

After each of the secondary battery prepared in Example 4 and the lithium secondary battery prepared in Comparative Example 4 was activated at a CC of 0.1 C, degassing was performed.

Subsequently, a discharge capacity retention (%) after 2 weeks high-temperature storage and a resistance increase rate (%) after 2 weeks high-temperature storage were calculated by the same method as the method of evaluating high-temperature (60° C.) storage durability of Experimental Example 1-2, and the results thereof are then presented in Table 3 below.

TABLE 3

|  | After 2 weeks of high-temperature (60° C.) storage | |
| --- | --- | --- |
|  | Capacity retention (%) | Resistance increase rate (%) |
| Example 4 | 99.04 | −4.39 |
| Comparative Example 4 | 98.85 | −2.70 |

Referring to Table 3, it may be understood that a capacity retention and a resistance increase rate after high-temperature storage of the secondary battery of Example 4 were improved in comparison to those of Comparative Example 4, respectively.

Experimental Example 2-1: High-Temperature (45° C.) Life Characteristics Evaluation (1)

After each of the lithium secondary battery prepared in Example 1 and the secondary battery prepared in Comparative Example 1 was activated at a CC of 0.1 C, degassing was performed.

Subsequently, each lithium secondary battery was charged at 0.33 C rate to 4.20 V under a constant current-constant voltage (CC-CV) condition at 25° C., then subjected to 0.05 C current cut-off, and discharged at 0.33 C rate under a constant current condition to 2.5 V. After the above charging and discharging were defined as one cycle and three cycles were performed, initial discharge capacity was measured using PNE-0506 charge/discharge equipment (manufacturer: PNE SOLUTION Co., Ltd., 5 V, 6 A). Then, after each lithium secondary battery was charged to a state of charge (SOC) of 50%, initial resistance was calculated by a voltage drop obtained in a state in which each lithium secondary battery was subjected to a discharge pulse at 2.5 C for 10 seconds. In this case, the voltage drop was measured using PNE-0506 charge/discharge equipment (manufacturer: PNE SOLUTION Co., Ltd., 5 V, 6 A).

Subsequently, each lithium secondary battery was charged at 0.33 C rate to 4.20 V under a constant current-constant voltage (CC-CV) condition at 45° C., then subjected to 0.05 C current cut-off, and discharged at 0.33 C rate under a constant current condition to 2.5 V. The above charging and discharging were defined as one cycle, and a resistance increase rate (%) was measured while 200 cycles of charging and discharging were performed at a high temperature (45° C.).

In this case, the resistance increase rate (%) was measured at 50 cycle intervals, wherein, after each lithium secondary battery was charged to a state of charge (SOC) of 50% after the charge and discharge cycles were performed, direct current internal resistance (hereinafter, referred to as "DC-iR") was calculated by a voltage drop obtained in a state in which each lithium secondary battery was subjected to a discharge pulse at 2.5 C for 10 seconds, and this was substituted into the following [Equation 3] to calculate the resistance increase rate (%). The measurement results are presented in FIG. 2. In this case, the voltage drop was measured using PNE-0506 charge/discharge equipment (manufacturer: PNE SOLUTION Co., Ltd., 5 V, 6 A).

Resistance increase rate (%)={(resistance after cycles-initial resistance)/initial resistance}×100  [Equation 3]

Referring to FIG. 2, with respect to the secondary battery of Example 1, since a stable film was formed on the surfaces of the positive electrode/negative electrode, it may be confirmed that the resistance increase rate was improved in comparison to that of Comparative Example 1 due to the suppression of additional electrolyte decomposition when long-term charge and discharge at high temperature were performed.

Experimental Example 2-2: High-Temperature (45° C.) Life Characteristics Evaluation (2)

After each of the lithium secondary battery prepared in Example 2 and the secondary battery prepared in Comparative Example 2 was activated at a CC of 0.1 C, degassing was performed.

Subsequently, each lithium secondary battery was charged at 0.33 C rate to 4.20 V under a constant current-constant voltage (CC-CV) condition at 25° C., then subjected to 0.05 C current cut-off, and discharged at 0.33 C rate under a constant current condition to 2.5 V. After the above charging and discharging were defined as one cycle and three cycles were performed, initial discharge capacity was measured using PNE-0506 charge/discharge equipment (manufacturer: PNE SOLUTION Co., Ltd., 5 V, 6 A). Then, after each lithium secondary battery was charged to a state of charge (SOC) of 50%, initial resistance was calculated by a voltage drop obtained in a state in which each lithium secondary battery was subjected to a discharge pulse at 2.5 C for 10 seconds. In this case, the voltage drop was measured using PNE-0506 charge/discharge equipment (manufacturer: PNE SOLUTION Co., Ltd., 5 V, 6 A).

Subsequently, each lithium secondary battery was charged at 0.33 C rate to 4.20 V under a constant current-constant voltage (CC-CV) condition at 45° C., then subjected to 0.05 C current cut-off, and discharged at 0.33 C rate under a constant current condition to 2.5 V. The above charging and discharging were defined as one cycle, and 50 cycles of charging and discharging were performed at a high temperature (45° C.).

After 50 cycles, at 25° C. each lithium secondary battery was charged at 0.33 C rate to 4.20 V under a constant current-constant voltage (CC-CV) condition and then discharged at 0.33 C rate under a constant current condition to 2.5 V to measure discharge capacity using PNE-0506 charge/discharge equipment (manufacturer: PNE SOLUTION Co., Ltd., 5 V, 6 A), this was substituted into the following [Equation 4] to measure a capacity retention, and the results thereof are presented in Table 4 below.

Then, direct current internal resistance (hereinafter, referred to as "DC-iR") was calculated by a voltage drop obtained in a state in which each lithium secondary battery was subjected to a discharge pulse at 2.5 C for 10 seconds at an SOC of 50%, this was substituted into [Equation 3] to calculate a resistance increase rate (%), and the results thereof are then presented in Table 4 below. In this case, the voltage drop was measured using PNE-0506 charge/discharge equipment (manufacturer: PNE SOLUTION Co., Ltd., 5 V, 6 A).

Capacity retention (%)=(discharge capacity after cycles/initial discharge capacity)×100  [Equation 4]

TABLE 4

| | After 50 cycles at high temperature (45° C.) | |
|---|---|---|
| | Capacity retention (%) | Resistance increase rate (%) |
| Example 2 | 94.0 | 1.93 |
| Comparative Example 2 | 93.6 | 4.01 |

Referring to Table 4, with respect to the secondary battery of Example 2, since a stable film was formed on the surfaces of the positive electrode/negative electrode, it may be confirmed that the resistance increase rate was improved in comparison to that of Comparative Example 2 due to the suppression of additional electrolyte decomposition when long-term charge and discharge at high temperature were performed.

The invention claimed is:

1. A non-aqueous electrolyte solution for a lithium secondary battery, comprising:
    a lithium salt;
    an organic solvent;
    a compound represented by Formula 1 as a first additive; and
    lithium difluorophosphate (LiDFP) as a second additive:

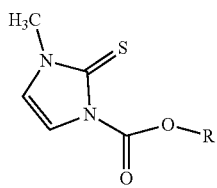

[Formula 1]

wherein, in Formula 1,
    R is a substituted or unsubstituted alkyl group having 1 to 5 carbon atoms.

2. The non-aqueous electrolyte solution for a lithium secondary battery of claim 1, wherein, in Formula 1, R is a substituted or unsubstituted alkyl group having 1 to 3 carbon atoms.

3. The non-aqueous electrolyte solution for a lithium secondary battery of claim 1, wherein the compound represented by Formula 1 comprises a compound represented by Formula 1a

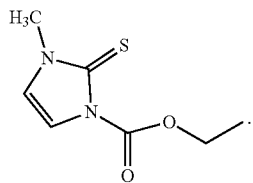

[Formula 1a]

4. The non-aqueous electrolyte solution for a lithium secondary battery of claim 1, wherein the compound represented by Formula 1 is included in an amount of 0.1 wt % to 5 wt % based on a total weight of the non-aqueous electrolyte solution.

5. The non-aqueous electrolyte solution for a lithium secondary battery of claim 1, wherein the second additive is included in an amount of 0.1 wt % to 5 wt % based on a total weight of the non-aqueous electrolyte solution.

6. The non-aqueous electrolyte solution for a lithium secondary battery of claim 1, wherein a weight ratio of the first additive to the second additive is in a range of 1:1 to 1:10.

7. The non-aqueous electrolyte solution for a lithium secondary battery of claim 6, wherein the weight ratio of the first additive to the second additive is in a range of 1:1 to 1:5.

8. The non-aqueous electrolyte solution for a lithium secondary battery of claim 1, further comprising at least one third additive of a cyclic carbonate-based compound, a halogen-substituted carbonate-based compound, a sultone-based compound, a sulfate-based compound, a phosphate-based compound, a borate-based compound, a nitrile-based compound, a benzene-based compound, an amine-based compound, a silane-based compound, or a lithium salt-based compound.

9. A lithium secondary battery comprising the non-aqueous electrolyte solution for a lithium secondary battery of claim 1.

* * * * *